(12) United States Patent
Choi et al.

(10) Patent No.: US 7,787,333 B2
(45) Date of Patent: Aug. 31, 2010

(54) METHOD AND APPARATUS FOR CONTROLLING AN OPTICAL DISK DEVICE

(75) Inventors: Seuk Ho Choi, Suwon-si (KR); Kyu Tae Kang, Osan-si (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 783 days.

(21) Appl. No.: 11/698,911

(22) Filed: Jan. 29, 2007

(65) Prior Publication Data

US 2007/0209046 A1    Sep. 6, 2007

(30) Foreign Application Priority Data

Feb. 9, 2006    (KR) ..................... 10-2006-0012536

(51) Int. Cl.
*G11B 7/00* (2006.01)
*G11B 17/22* (2006.01)

(52) U.S. Cl. .................. 369/44.29; 369/30.32; 720/703

(58) Field of Classification Search .............. 369/44.29, 369/44.34, 44.35, 53.37, 30.27, 30.32; 720/703
See application file for complete search history.

(56) References Cited

U.S. PATENT DOCUMENTS

| | | | |
|---|---|---|---|
| 5,187,696 A * | 2/1993 | Ishii et al. ................. | 369/44.29 |
| 6,169,711 B1 | 1/2001 | Koh | |
| 6,496,464 B1 | 12/2002 | Yamauchi et al. | |
| 2005/0249101 A1 | 11/2005 | Tokunaga | |
| 2006/0026620 A1 | 2/2006 | Shirakawa | |
| 2008/0231218 A1 * | 9/2008 | Oh et al. ................. | 318/400.11 |

FOREIGN PATENT DOCUMENTS

| | | |
|---|---|---|
| CN | 1180893 | 5/1998 |
| CN | 1770290 | 5/2006 |
| EP | 1643499 | 4/2006 |
| JP | 2000-285561 | 10/2000 |
| JP | 2000-306317 | 11/2000 |
| KR | 2001-0033567 | 4/2001 |
| WO | WO 01/57865 | 8/2001 |

OTHER PUBLICATIONS

Korean Office Action dated Nov. 20, 2006.
Chinese Office Action dated Mar. 27, 2009.
Chinese Office Action dated Apr. 4, 2008.
European Search Report dated Nov. 25, 2008.

* cited by examiner

*Primary Examiner*—Ali Neyzari
(74) *Attorney, Agent, or Firm*—Ked & Associates LLP

(57) ABSTRACT

An apparatus and method for controlling an optical disk device performs a disk loading and unloading operation based on at least one driving signal containing multiple pulses of different widths. The pulses are applied to control a motor to unclamp the disk relative to a spindle. Because the signal is formed from multiple pulses of different widths, the unclamping operation is performed with little or no shock forces and as a result the disk is ejected without damage and without being dislodged from the device.

22 Claims, 5 Drawing Sheets

Disc Insertion (a)

(b)

7,787,333 B2

METHOD AND APPARATUS FOR CONTROLLING AN OPTICAL DISK DEVICE

BACKGROUND

1. Field

One or more embodiments described herein relate to a method and apparatus for controlling an optical disk device.

2. Background

Optical disk devices may be classified in terms of their loading methods. A top-loading device requires a lid to be opened to allow for insertion of a disk. A slot-type device allows a disk to be inserted through a slot in a device housing. And, a tray-type device requires a disk to be placed on a tray that moves between extended and retracted positions when a door or button is pushed. Because of internal inertial forces, position, orientation and/or other reasons, these and other types of disk devices may fail to properly load and unload disks during use.

BRIEF DESCRIPTION OF THE DRAWINGS

The embodiments will be described in detail with reference to the following drawings in which like reference numerals refer to like elements wherein.

DETAILED DESCRIPTION

Optical disk devices may be used in various orientations based on user preferences, space considerations, and/or manufacturer design specifications. For example, a user may place a computer or audio/visual system containing a disk device in a horizontal or vertical orientation in order to make the most efficient use of available space or to suit the user's tastes. In consideration of this fact, an optical disk device in accordance with one or more embodiments may be designed to operate in any direction (e.g., both vertical and horizontal directions) for any one of a variety of loading techniques including but not limited to a top-loading type, a slot-loading type, and a tray-loading type.

Figure 1:
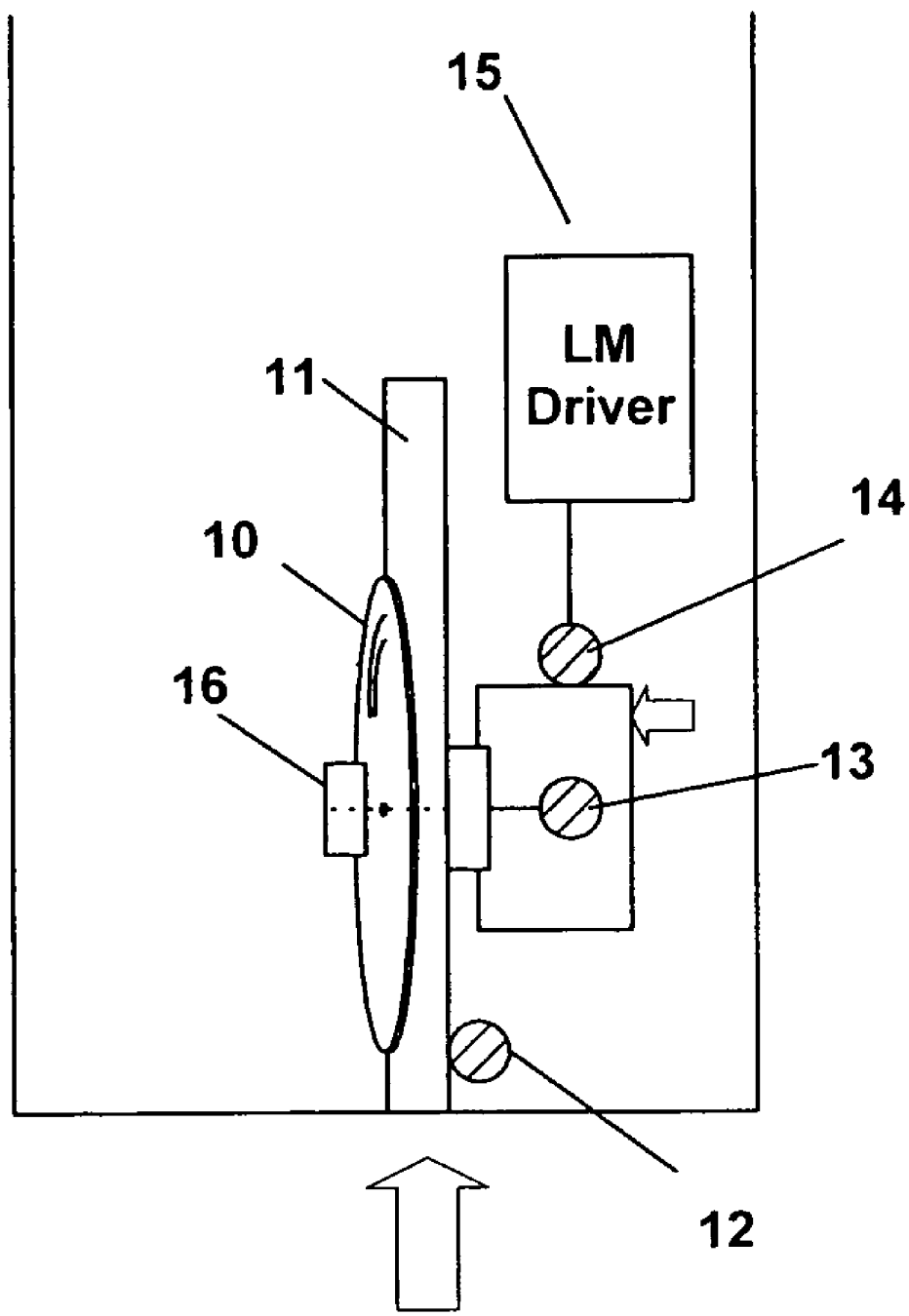
FIG. 1 is a diagram showing insertion of a tray into an optical disk device.

FIG. 1 shows a tray-type optical disk device arranged in a vertical direction. This device has a loading/unloading mechanism that includes a disk tray 11, a tray loading motor 12, a spindle motor 13, a spindle loading motor 14, a loading motor driver 15, and a clamper 16. The tray loading motor 12 is activated when, for example, a user pushes an inserting/ejecting button or the disk tray. This motor causes the tray to extend out from the device. A user places then places an optical disk 10 on the tray and pushes the button or tray again. The tray then moves back into the device under control of motor 12. The optical disk may be any one of a variety of disks including but not limited to CD-RW, DVD-RW, and Blu-ray disks.

When the disk tray moves into the optical disk device, loading motor driver 15 applies a driving force to spindle loading motor 14. This force causes a body of spindle motor 13 to move toward the optical disk. The optical disk is then clamped by clamper 16 and the spindle motor using, for example, a magnetic member or substance.

Figure 2:
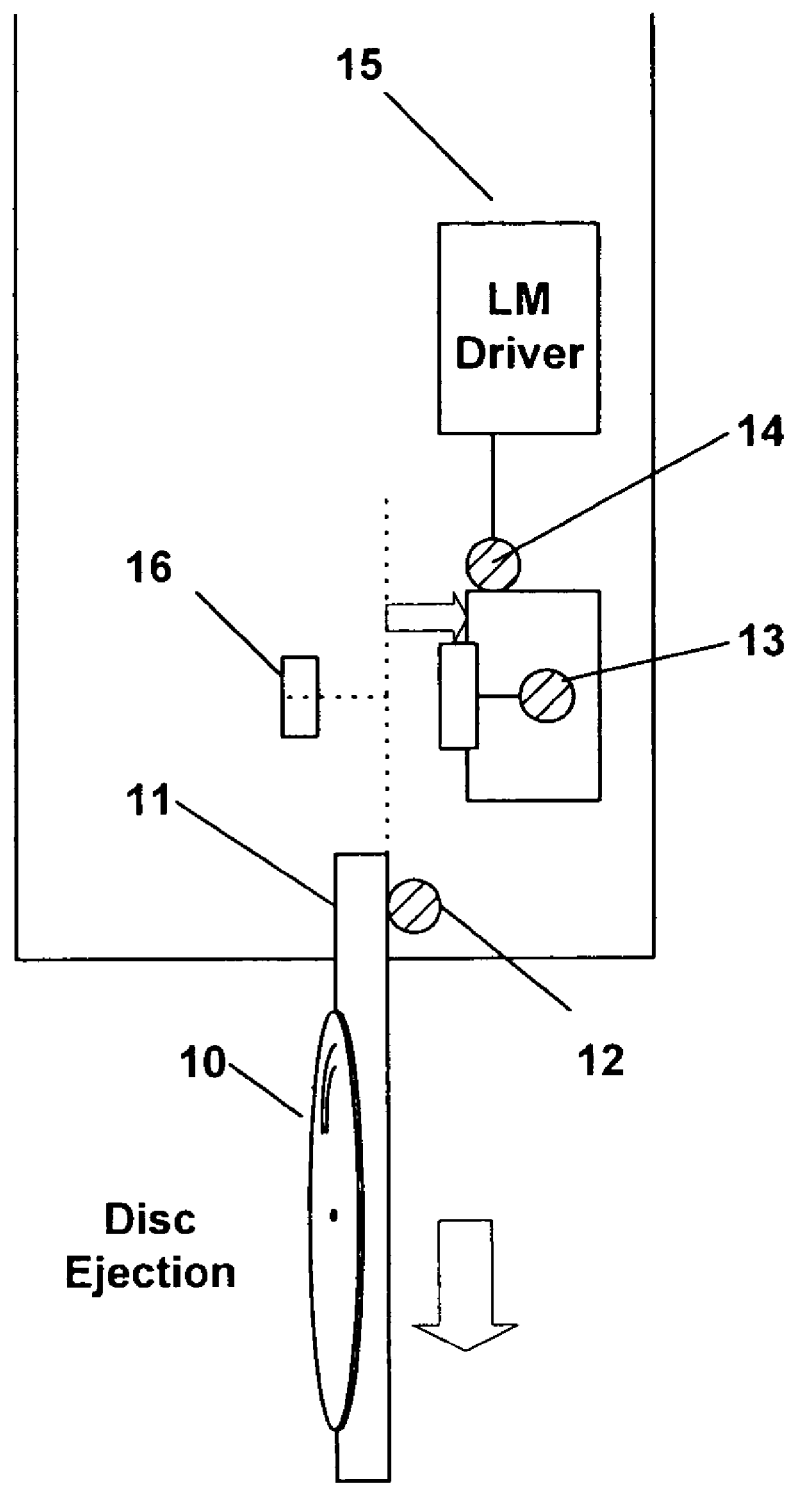
FIG. 2 is a diagram showing ejection of a tray from the optical disk device.

FIG. 2 shows how the tray-type optical disk device performs a disk ejection operation. When the user pushes the inserting/ejecting button or tray again, loading motor driver 15 applies a reverse driving force to spindle loading motor 14 to cause the body of spindle motor 13 to move apart from the optical disk and clamper. After the clamper and spindle motor separate, the disk tray is ejected by a driving force applied by the tray loading motor.

While the forces applied by clamper and spindle motor may be sufficient to hold the disk in place during a read or write operation, the disk may not be so stably secured during a disk unloading procedure. For example, during an unloading operation, because of the magnetic forces applied during clamping, the clamper and spindle motor must be coercively separated from one another through application of a reverse driving force by spindle loading motor 14. Motor 14 applies this force in response to a corresponding driving signal.

Figure 3:
FIG. 3 is a diagram showing one type of driving signal that may be applied to separate a clamper and a spindle motor during ejection of the tray.

FIG. 3 shows one type of driving signal that may be applied to the spindle loading motor in order to separate the clamper and spindle motor during an unloading operation. This driving signal is in the form of a long pulse, which is considered undesirable for at least some applications because it can generate a shock to the body of the spindle motor when the motor is separated from the clamper.

More specifically, when the driving signal transitions from a low state to a high state, a shock may be delivered to the spindle motor and, also, the disk which is held between the spindle motor and clamper by magnetic forces at this time. When the clamper and spindle motor are separated as a result of the high state of the driving signal, a disk attached to the clamper and spindle motor may be badly shaken by inertial forces, thereby causing the disk to be damaged or disoriented relative to the tray, or to fall out when the tray ejects. This is especially possible when the optical disk device is placed in a vertical orientation.

Figure 4:
FIG. 4 is a diagram showing another type of driving signal that may be applied to separate a clamper and a spindle motor in an optical disk device.
Figure 4:
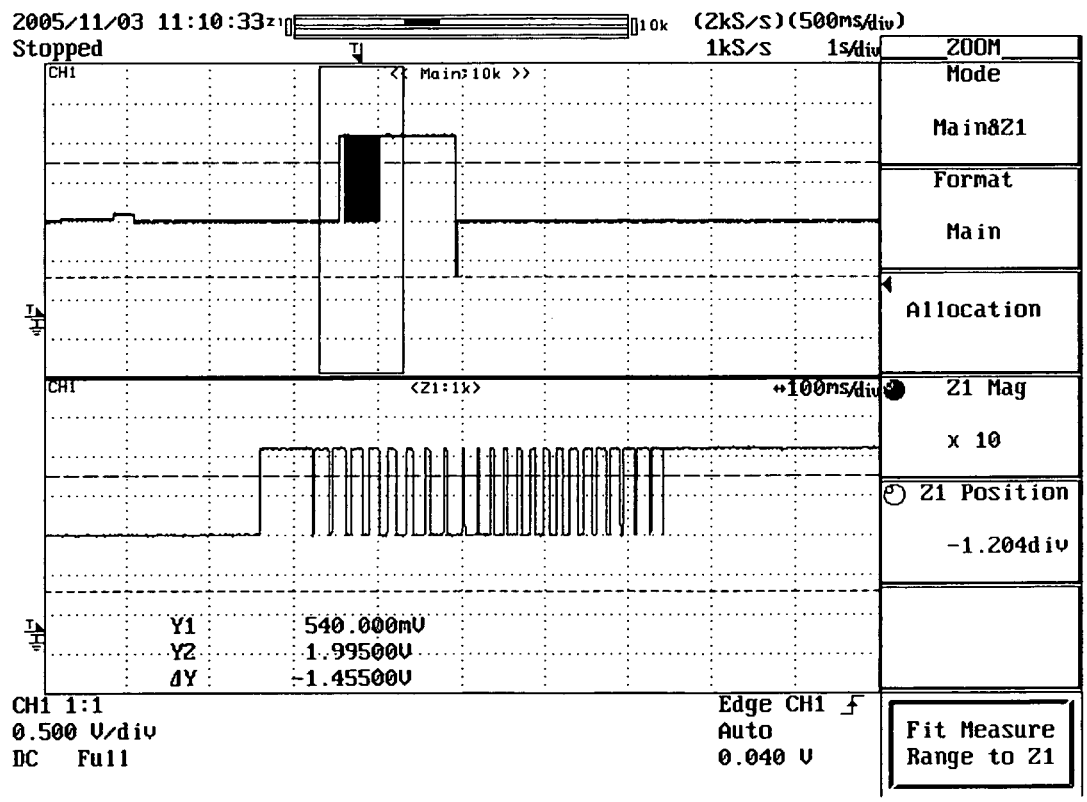

FIG. 4 shows another driving signal that may be used to prevent these adverse effects from occurring. This driving signal includes at least one and preferably a plurality of short pulses which precede a single long pulse. The short pulse(s) may have a same or different height relative to each other and/or the long pulse, and/or may be uniformly or non-uniformly spaced relative to one another and/or the long pulse. When a driving signal of this type is applied to the spindle loading motor, the shock and inertial forces that occur when the clamper and spindle motor are separated from each other are reduced or eliminated, thereby preventing the disk from being damaged or disoriented or from falling out when the tray is ejected during an unloading operation.

Figure 5:
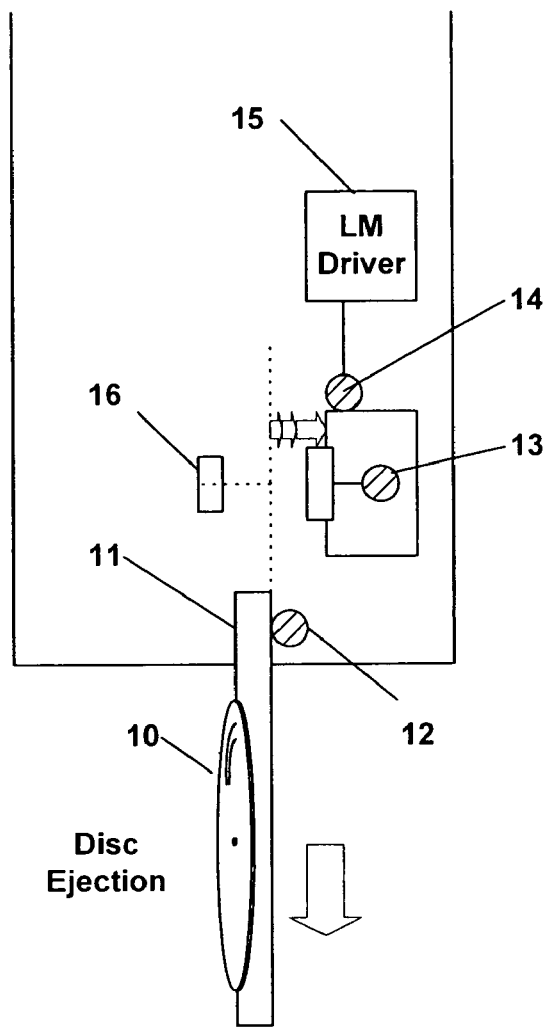
FIG. 5 is another diagram showing ejection of the tray from an optical disk device.

FIG. 5 shows a diagram of how the tray may be ejected from an optical disk device according to one embodiment. When ejecting the disk tray, loading motor (LM) driver 15 applies a driving signal containing one or more short pulses (e.g., such as shown in FIG. 4) to spindle loading motor 14. This driving signal causes spindle loading motor 14 to generate a gradual increase in a reverse driving force which is applied to spindle motor 13. As a result, spindle motor 13 gradually and smoothly separates from clamper 16, thereby reducing or preventing shock and inertial forces from being delivered to the spindle motor and thus disk during an unloading operation. The optical disk may therefore be ejected from the tray without experiencing damage or disorientation and without falling off the tray, as is possible with the driving signal of FIG. 3.

Figure 6:
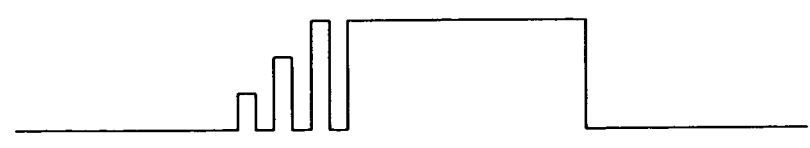
FIGS. 6A and 6B are diagrams showing additional driving signals that may be applied to an optical disk device.
Figure 6:
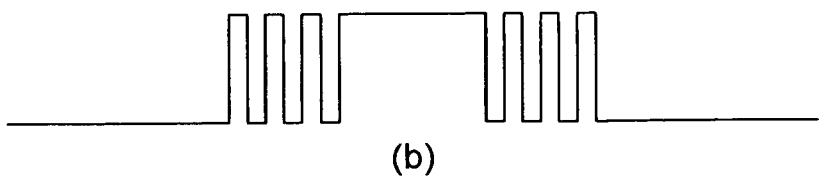

FIG. 6A shows another type of driving signal that may be applied to the spindle loading motor to separate the clamper and spindle motor during a disk unloading operation. This driving signal includes a plurality of short pulses located in front of a long pulse. As shown, the heights of the short pulses gradually increase. Also, the short pulses may have the same or different widths relative to each other and/or the long pulse, and/or may be uniformly or non-uniformly spaced relative to one another and/or the long pulse. By applying a driving signal of this type, the clamper and spindle motor may smoothly separate, thereby preventing the disk from being damaged and/or falling out during an unloading procedure.

FIG. 6B shows another type of driving signal that may be applied during a disk unloading operation. This driving signal includes one or a plurality of short pulses both before and after a long pulse. The short pulses may have the same or different widths relative to each other and/or the long pulse, and/or may be uniformly or non-uniformly spaced relative to one another and/or the long pulse. Also, while FIG. 6B shows that the shorter pulses all have the same height, in alternative embodiments the heights of the short pulses before and/or after the long pulse may have different heights, or the short pulses on one side of the long pulse may have the same height and the short pulses on the other side of the long pulse may have different heights.

According to another variation, the driving signal may have a plurality of short pulses in front of a long pulse, where heights of the short pulses gradually increase at a beginning portion thereof and gradually decrease at an ending portion thereof.

According to another variation, the driving signal may have a plurality of pulses in front of a long pulse with ascending or descending heights and a plurality of pulses after the long pulse with descending or ascending heights.

According to another variation, different driving signals may be applied during disk loading and unloading operations. For example, a driving signal for disk loading (e.g., to be used when the tray is inserted into the optical disk device) may include one or a plurality of short pulses only in front of a long pulse. A driving signal for disk unloading (e.g., to be used when the tray is ejected from the optical disk device) may include one or a plurality of short pulses both before and after a long pulse.

The time to apply any of the driving signals discussed above may be arbitrarily decided or decided or adjusted based on, for example, the number of rotations of the spindle motor or spindle loading motor.

Figure 7:
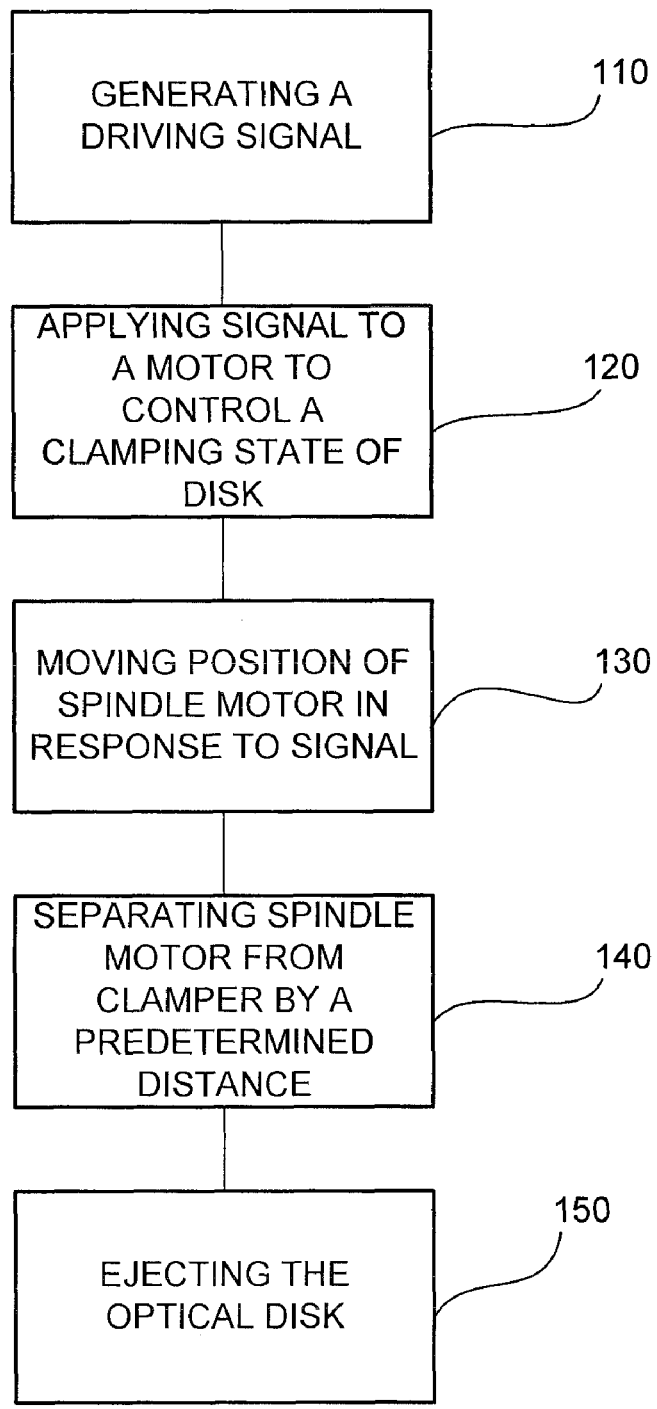
FIG. 7 is a flow diagram showing steps included in one embodiment of a method for controlling an optical disk device.

FIG. 7 is a flow diagram showing steps included in a method for controlling an optical disk device according to one embodiment. The method includes generating a driving signal that includes at least two pulses of different widths (Block 110) and then applying the driving signal to a spindle loading motor to control a clamping state of a disk (Block 120). In response to the driving signal, the spindle loading motor moves a spindle motor to a retracted position (Block 130) and in so doing separates the spindle motor from a clamper by a predetermined distance (Block 140). The optical disk may then be ejected (Block 150), which, for example, may be accomplished through a slot, a tray, or from a top portion of the device.

Another embodiment corresponds to a computer-readable medium that stores a computer program for controlling operations required for performing disk loading and unloading operations. This program may, for example, control loading motor driver 15 to clamp or unclamp a disk. To perform these operations, the program may include a first code section which causes a controller (e.g, LM driver 15) of an optical disk device to generate a driving signal that includes at least two pulses of different widths, and a second code section which causes the controller to apply the driving signal to control a clamping state of a disk in the optical disk device. In the device shown in FIG. 5, the driving signal may, for example, control spindle loading motor 14 to retract the position of spindle motor 13 relative to clamper 16 to allow the tray to eject disk 10.

While many of the foregoing embodiments are described as being applied to a tray-type optical disk device, other embodiments contemplate using the driving signal containing the short pulses previously described to eject disks in other types of devices, including but not limited to slot-type and top-loading optical disk devices.

In accordance with another embodiment, a method for loading/unloading a disk in an optical disk device comprises gradually generating driving force to release a clamping state of the disk when an ejection of the disk is required; and ejecting a tray on which the disk is placed after the clamping state of the disk is released.

In one embodiment, a driving signal having a plurality of pulses is applied to a motor for clamping or unclamping the disk so as to generate the driving force. At this time, the driving signal may begin with a plurality of short pulses and/or end with a plurality of short pulses. In another embodiment, the driving signal may begin with a plurality of short pulses in which a height of each pulse is gradually increased and/or end with a plurality of short pulses in which a height of each pulse is gradually reduced. A time to apply the driving signal may be decided by experiments or may be adjusted on the basis of a number of rotations of the motor.

Another embodiment provides a method for loading/unloading a disk in an optical disk device, comprising confirming a requirement for inserting or ejecting the disk; and gradually generating driving force to move the tray, on which the disk is placed, according to the confirmed requirement.

A driving signal having a plurality of pulses is applied to a motor for moving the tray so as to generate the driving force. When the disk is required to be ejected, the driving signal ends with a plurality of short pulses, or ends with a plurality of short pulses in which a height of each pulse is gradually reduced.

Another embodiment provides an apparatus for controlling an optical disk device. The apparatus includes a controller to generate a signal having at least two pulses of different widths and a motor to control a clamping state of a disk in response to the signal. The signal may be any of the driving signals previously mentioned and therefore may include a first number of pulses and a second number of pulses having widths different from the first number of pulses.

Another embodiment provides an optical disk device comprising a clamper, a spindle motor, a tray for supporting a disk, a controller to generate a signal having at least two pulses of different widths, and a loading motor to control a separation distance between the clamper and spindle motor in response to the signal, said separation distance sufficient to allow the tray to move during a disk loading or unloading operation.

Another embodiment provides a computer-readable medium comprising a first code section which causes a controller of an optical disk device to generate a driving signal that includes at least two pulses of different widths, and a second code section which causes the controller to apply the driving signal to control a clamping state of a disk in the optical disk device. The optical disk device may be a tray-type, slot-type, or top-loading device.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments of the present invention have been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A method for controlling an optical disk device, comprising:
    generating a driving signal that includes at least two pulses of different widths; and
    applying the driving signal to control a clamping state of a disk in the device,
    wherein the driving signal controls separation between a clamper and a spindle motor during a disk loading or unloading operation.

2. The method of claim 1, wherein the driving signal includes:
    a first number of pulses; and
    a second number of pulses, wherein a width of each of the second number of pulses is larger than a width of each of the first number of pulses.

3. The method of claim 2, wherein the first number of pulses is greater than one.

4. The method of claim 3, wherein the second number of pulses is one.

5. The method of claim 2, wherein the first number of pulses have substantially a same width.

6. The method of claim 2, wherein the first number of pulses have substantially a same height.

7. The method of claim 2, wherein the first number of pulses have different heights.

8. The method of claim 7, wherein the first number of pulses have ascending heights.

9. The method of claim 2, wherein the first number of pulses and the second number of pulses have substantially a same height.

10. The method of claim 2, wherein the driving signal further includes: a third number of pulses, wherein the first number of pulses and the third number of pulses are located on different sides of the second number of pulses.

11. The method claim 10, wherein the first number of pulses and the third number of pulses have substantially a same height.

12. The method of claim 2, wherein the height of the first and third numbers of pulses is substantially equal to a height of the second number of pulses.

13. The method of claim 1, wherein said applying includes: applying the driving signal at a time based on a performance parameter of the optical disk device.

14. The method of claim 13, wherein the driving signal is applied based on a predetermined number of rotations of a motor of the optical disk device.

15. The method of claim 14, wherein the at least two pulses control rotation of the motor.

16. An apparatus for controlling an optical disk device, comprising:
    a controller to generate a signal having at least two pulses of different widths; and
    a motor to control a clamping state of a disk in response to the signal, wherein the motor is configured to control a separation distance between a clamper and a spindle motor during a disk loading or unloading operation.

17. An optical disk device, comprising:
    a clamper;
    a spindle motor;
    a tray for supporting a disk;
    a controller configured to generate a signal having at least two pulses of different widths; and
    a loading motor configured to control a separation distance between the damper and spindle motor in response to the signal, said separation distance sufficient to allow the tray to move during a disk loading or unloading operation.

18. The method of claim 1, further comprising:
    applying another driving signal to a tray loading motor to eject a tray supporting the disk after the driving signal is applied during the disk unloading operation.

19. The method of claim 18, wherein said another driving signal includes a first pulse and one or more second pulses applied before and after the first pulse, wherein the first pulse is longer than each of the second pulses.

20. The method of claim 1, further comprising:
    applying another driving signal to a tray loading motor so that the disk may be inserted onto a tray during the loading operation.

21. The method of claim 20, wherein said another driving signal includes a first pulse and one or more second pulses applied before the first pulse, and wherein the first pulse is longer than each of the second pulses.

22. The method of claim 1, wherein the driving signal is applied to a spindle loading motor which applies a driving force to the spindle motor to cause the spindle motor to separate from the clamper.

* * * * *